(12) United States Patent
Kageyama et al.

(10) Patent No.: US 10,822,432 B2
(45) Date of Patent: Nov. 3, 2020

(54) RUBBER COMPOSITION, MODIFIED DIENE POLYMER AND METHOD FOR PRODUCING MODIFIED DIENE POLYMER

(71) Applicant: THE YOKOHAMA RUBBER CO., LTD., Tokyo (JP)

(72) Inventors: Hirokazu Kageyama, Hiratsuka (JP); Kazushi Kimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 16/756,584

(22) PCT Filed: Oct. 23, 2018

(86) PCT No.: PCT/JP2018/039369
§ 371 (c)(1),
(2) Date: Apr. 16, 2020

(87) PCT Pub. No.: WO2019/082895
PCT Pub. Date: May 2, 2019

(65) Prior Publication Data
US 2020/0239603 A1 Jul. 30, 2020

(30) Foreign Application Priority Data
Oct. 25, 2017 (JP) .................................. 2017-206419

(51) Int. Cl.
C08C 19/25 (2006.01)
B60C 1/00 (2006.01)
C08L 9/06 (2006.01)
C08C 19/22 (2006.01)

(52) U.S. Cl.
CPC ............ C08C 19/25 (2013.01); B60C 1/00 (2013.01); C08C 19/22 (2013.01); C08L 9/06 (2013.01); C08L 2205/025 (2013.01); C08L 2205/03 (2013.01)

(58) Field of Classification Search
CPC .................. C08C 19/22; C08C 19/25
See application file for complete search history.

(56) References Cited

U.S. PATENT DOCUMENTS 6,372,855 B1 * 4/2002 Chino ................. C08F 8/00
525/327.4
2010/0099795 A1 * 4/2010 Uesaka .................. C08L 15/00
523/152

FOREIGN PATENT DOCUMENTS

JP 2008-297445 A 12/2008

* cited by examiner

*Primary Examiner* — Robert C Boyle
(74) *Attorney, Agent, or Firm* — Carrier Blackman & Associates, P.C.; Joseph P. Carrier; William D. Blackman

(57) ABSTRACT

The present invention includes a rubber composition containing a modified diene polymer having a group represented by Formula (I) below and a group represented by Formula (II) below, and silica; and a modified diene polymer and a production method thereof. In Formula (I), $X_1$ represents at least one selected from the group consisting of a nitrogen atom, an oxygen atom, and a sulfur atom, $X_3$ represents a hydrocarbon group, n3 represents from 0 to 4, and $X_2$ represents at least one selected from the group consisting of sulfone-based protecting groups, carbamate-based protecting groups, and $-(R-O)_{n4}-H$. In Formula (II), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, and $R_{1-4}$ represents a hydrogen atom or a hydrocarbon group.

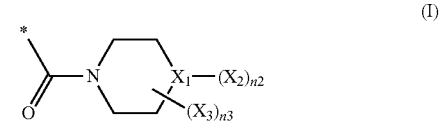

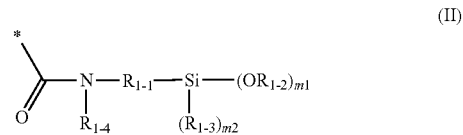

11 Claims, No Drawings

RUBBER COMPOSITION, MODIFIED DIENE POLYMER AND METHOD FOR PRODUCING MODIFIED DIENE POLYMER

TECHNICAL FIELD

The present invention relates to a rubber composition, a modified diene polymer, and a method for producing the modified diene polymer.

BACKGROUND ART

In the related art, silica has been widely used in rubber compositions used in a tire in order to reduce a rolling resistance of the tire. Particles of the silica are more likely to aggregate with each other, and a dispersion of the silica in rubber is generally difficult. To improve the dispersibility of the silica, for example, a method for adding a liquid rubber has been known.

As the rubber composition containing a liquid rubber, for example, Patent Document 1 describes, to provide a rubber composition for a tire tread, in which silica dispersibility is enhanced, the rubber composition for a tire tread containing from 30 to 150 parts by weight of a reinforcing filler containing 80 wt. % or greater of silica having a BET specific surface area of 100 to 300 m²/g and from 1 to 20 parts by weight of a liquid polyisoprene having from 2 to 10 carboxyl groups per one molecule and having a number average molecular weight of 10000 to 60000, per 100 parts by weight of a diene rubber containing 50 parts by weight or greater of a high vinyl and high molecular weight styrene butadiene copolymer rubber.

CITATION LIST

Patent Literature

Patent Document 1: JP 2008-297445A

SUMMARY OF INVENTION

Technical Problem

In such circumstances, the present inventors have found that, as a result of preparing a rubber composition containing a liquid polyisoprene having a carboxyl group by referring to Patent Document 1 and evaluating the prepared rubber composition, such a composition cannot improve the Mooney viscosity, exhibits poor processability, and may have low silica dispersibility (Comparative Example 1).

Therefore, an object of the present invention is to provide a modified diene polymer that can make the processability of the rubber composition excellent and that can lead to improvement of the silica dispersibility.

Furthermore, another object of the present invention is to provide a rubber composition and a method for producing the modified diene polymer.

Solution to Problem

As a result of diligent research to solve the problems described above, the present inventors found that a desired effect can be achieved by allowing a modified diene polymer to have a predetermined group, and thus completed the present invention.

The present invention is based on the findings described above and, specifically, solves the problem described above by the following features.

[1]
A rubber composition containing:
a modified diene polymer having a group represented by Formula (I) below and
a group represented by Formula (II) below; and
silica.

[Chemical Formula 1]

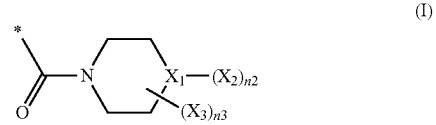

In Formula (I), $X_1$ represents at least one selected from the group consisting of a nitrogen atom, an oxygen atom, and a sulfur atom, $X_3$ represents a hydrocarbon group, n3 represents from 0 to 4, and * represents a bonding position.

In the case where $X_1$ is a nitrogen atom, n2 is 1, $X_2$ represents at least one selected from the group consisting of sulfone-based protecting groups, carbamate-based protecting groups, and Formula ($X_2$-1): $—(R—O)_{n4}—H$, and in Formula ($X_2$-1), R each independently represents a divalent hydrocarbon group, and n4 represents from 1 to 10.

In the case where $X_1$ is an oxygen atom or a sulfur atom, n2 represents 0.

[Chemical Formula 2]

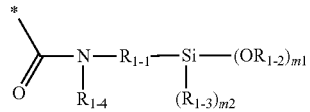

In Formula (II), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, $R_{1-4}$ represents a hydrogen atom or a monovalent hydrocarbon group, and * represents a bonding position.

[2]
The rubber composition according to [1], where, in Formula (I) above, $X_1$ represents a nitrogen atom, n2 is 1, and $X_2$ represents Formula ($X_2$-1) above.

[3]
The rubber composition according to [1], where, in Formula (I) above, $X_1$ represents an oxygen atom or a sulfur atom, and n2 is 0.

[4]
The rubber composition according to any one of [1] to [3], where the group represented by Formula (I) above is bonded to a side chain or a terminal of the modified diene polymer through an organic group.

[5]
The rubber composition according to any one of [1] to [4], where the group represented by Formula (II) above is bonded to a side chain or a terminal of the modified diene polymer through an organic group.

[6]
The rubber composition according to any one of [1] to [5], further containing a diene rubber (but other than the modified diene polymer).

[7]
A modified diene polymer containing a group represented by Formula (I) below and a group represented by Formula (II) below.

[Chemical Formula 3]

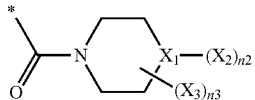

(I)

In Formula (I), $X_1$ represents at least one selected from the group consisting of a nitrogen atom, an oxygen atom, and a sulfur atom, $X_3$ represents a hydrocarbon group, n3 represents from 0 to 4, and * represents a bonding position.

In the case where $X_1$ is a nitrogen atom, n2 is 1, $X_2$ represents at least one selected from the group consisting of sulfone-based protecting groups, carbamate-based protecting groups, and Formula ($X_2$-1): —$(R—O)_{n4}$—H, and in Formula ($X_2$-1), R each independently represents a divalent hydrocarbon group, and n4 represents from 1 to 10.

In the case where $X_1$ is an oxygen atom or a sulfur atom, n2 represents 0.

[Chemical Formula 4]

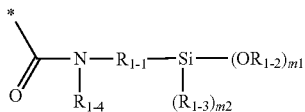

(II)

In Formula (II), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, $R_{1-4}$ represents a hydrogen atom or a monovalent hydrocarbon group, and * represents a bonding position.

[8]
A method for producing a modified diene polymer, where the modified diene polymer described in [7] is produced by reacting
a diene polymer having an acid anhydride group,
a heterocyclic compound represented by Formula (III), and
an amino silane coupling agent represented by Formula (IV).

[Chemical Formula 5]

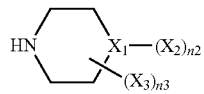

(III)

In Formula (III), $X_1$ represents at least one selected from the group consisting of a nitrogen atom, an oxygen atom, and a sulfur atom, $X_3$ represents a hydrocarbon group, and n3 represents from 0 to 4.

In the case where $X_1$ is a nitrogen atom, n2 is 1, $X_2$ represents at least one selected from the group consisting of sulfone-based protecting groups, carbamate-based protecting groups, and Formula ($X_2$-1): —$(R—O)_{n4}$—H, and in Formula ($X_2$-1), R each independently represents a divalent hydrocarbon group, and n4 represents from 1 to 10.

In the case where $X_1$ is an oxygen atom or a sulfur atom, n2 represents 0.

[Chemical Formula 6]

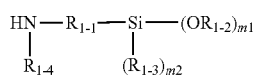

(IV)

In Formula (IV), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, and $R_{1-4}$ represents a hydrogen atom or a monovalent hydrocarbon group.

[9]
The method for producing a modified diene polymer according to [8], where a number of equivalent of active hydrogen bonding to a nitrogen atom in a heterocycle contained in the heterocyclic compound relative to the acid anhydride group (active hydrogen derived from NH< in Formula (III)/acid anhydride group) is from 0.1 to 2.0 molar equivalents.

[10]
The method for producing a modified diene polymer according to [8] or [9], where a number of equivalent of active hydrogen of an amino group and/or an imino group contained in the amino silane coupling agent relative to the acid anhydride group (active hydrogen derived from NH ($R_{1-4}$)— in Formula (IV)/acid anhydride group) is from 0.1 to 4.0 molar equivalents.

[11]
The method for producing a modified diene polymer according to any one of [8] to [10], where the diene polymer containing the acid anhydride group is liquid in an environment at 23° C.

Advantageous Effects of Invention

The rubber composition according to an embodiment of the present invention has excellent processability and silica dispersibility.

According to the modified diene polymer of an embodiment of the present invention, a rubber composition having excellent processability and silica dispersibility can be obtained.

According to the production method of an embodiment of the present invention, the modified diene polymer according to an embodiment of the present invention can be produced.

DESCRIPTION OF EMBODIMENTS

Embodiments of the present invention will be described in detail below.

Note that in the present specification, numerical ranges indicated using "(from) . . . to . . . " include the former number as the lower limit value and the latter number as the upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

In the present specification, the production method of each component is not particularly limited unless otherwise noted. Examples thereof include known methods.

Modified Diene Polymer

The modified diene polymer according to an embodiment of the present invention (compound according to an embodiment of the present invention) is a modified diene polymer having a group represented by Formula (I) below and a group represented by Formula (II) below.

[Chemical Formula 7]

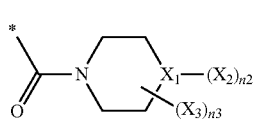
(I)

In Formula (I), $X_1$ represents at least one selected from the group consisting of a nitrogen atom, an oxygen atom, and a sulfur atom, $X_3$ represents a hydrocarbon group, n3 represents from 0 to 4, and * represents a bonding position.

In the case where $X_1$ is a nitrogen atom, n2 is 1, $X_2$ represents at least one selected from the group consisting of sulfone-based protecting groups, carbamate-based protecting groups, and Formula ($X_2$-1): —(R—O)$_{n4}$—H, and in Formula ($X_2$-1), R each independently represents a divalent hydrocarbon group, and n4 represents from 1 to 10.

In the case where $X_1$ is an oxygen atom or a sulfur atom, n2 represents 0.

[Chemical Formula 8]

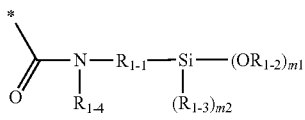
(II)

In Formula (II), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, $R_{1-4}$ represents a hydrogen atom or a hydrocarbon group, and * represents a bonding position.

The compound according to an embodiment of the present invention is thought to achieve desired effects as a result of having such a configuration. Although the reason is not clear, it is assumed to be as follows.

The heterocycle contained in the group represented by Formula (I) of the compound according to an embodiment of the present invention has hydrophilicity. Furthermore, the compound according to an embodiment of the present invention has a hydrolyzable silyl group (—Si—(OR$_{1-2}$)$_{m1}$ (R$_{1-3}$)$_{m2}$) in the group represented by Formula (II).

In the case where the compound according to an embodiment of the present invention is used for silica, it is conceived that the compound according to an embodiment of the present invention tends to interact with the silica because of having the hydrophilicity and the hydrolyzable silyl group.

As described above, the present inventors presume that the compound according to an embodiment of the present invention can enhance silica dispersibility, can reduce the Mooney viscosity of an unvulcanized rubber, and achieves excellent processability by the hydrophilicity and the hydrolyzable silyl group.

The present invention is described in detail below.

In the compound according to an embodiment of the present invention, the group represented by Formula (I) can bond to a backbone of the compound according to an embodiment of the present invention. The group represented by Formula (I) can bond to the backbone of the compound according to an embodiment of the present invention directly or through an organic group. The organic group is not particularly limited. The group represented by Formula (I) can bond to, for example, a side chain and/or a terminal of the compound according to an embodiment of the present invention.

The same applies to the group represented by Formula (II).

Group Represented by Formula (I)

The group represented by Formula (I) contained in the compound according to an embodiment of the present invention is as follows.

[Chemical Formula 9]

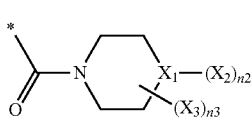
(I)

In Formula (I), $X_1$ represents at least one selected from the group consisting of a nitrogen atom, an oxygen atom, and a sulfur atom.

In Formula (I) above, $X_1$ is preferably an oxygen atom or a nitrogen atom, and more preferably an oxygen atom from the perspective of achieving superior processability and silica dispersibility.

$X_3$

In Formula (I), $X_3$ represents a hydrocarbon group (monovalent hydrocarbon group). The hydrocarbon group is not particularly limited. Examples thereof include aliphatic hydrocarbon groups (including straight-chain, branched chain, and cyclic), aromatic hydrocarbon groups, and combinations thereof.

In the case where the group represented by Formula (I) has $X_3$ (n3 is from 1 to 4), the hydrocarbon group is preferably formed only from carbon atom(s) and hydrogen atom(s) from the perspective of achieving superior processability and silica dispersibility.

n3

In Formula (I), n3 represents from 0 to 4.

From the perspective of achieving superior processability and silica dispersibility, n3 is preferably 0.

*

In Formula (I), * represents a bonding position. At * described above, the group represented by Formula (I) can bond to the backbone of the compound according to an embodiment of the present invention.

The group represented by Formula (I) can bond to the backbone of the compound according to an embodiment of the present invention directly or through an organic group at * described above. The organic group is not particularly limited.

Note that * in the group represented by Formula (II) is the same as * described above.

Case Where $X_1$ is Nitrogen Atom

In Formula (I), in the case where $X_1$ is a nitrogen atom, n2 is 1, and $X_2$ represents at least one selected from the group consisting of sulfone-based protecting groups, carbamate-based protecting groups, and Formula ($X_2$-1): —(R—O)$_{n4}$—H.

Sulfone-Based Protecting Group

Examples of the sulfone-based protecting group include a methanesulfonyl group, a tosyl group, and a nosyl group.

Carbamate-Based Protecting Group

Examples of the carbamate-based protecting group include a tert-butoxycarbonyl group, an allyloxycarbonyl group, a benzyloxycarbonyl group, and a 9-fluorenylmethyloxycarbonyl group.

Group Represented by Formula ($X_2$-1)

In Formula ($X_2$-1): —(R—O)$_{n4}$—H, R each independently represents a divalent hydrocarbon group.

R

In Formula ($X_2$-1), the divalent hydrocarbon group as R is not particularly limited. Examples thereof include aliphatic hydrocarbon groups (including straight-chain, branched chain, and cyclic), aromatic hydrocarbon groups, and combinations thereof.

The divalent hydrocarbon group is preferably an aliphatic hydrocarbon group. The aliphatic hydrocarbon group may be linear, branched, cyclic types or any combination thereof.

The divalent hydrocarbon group is preferably an alkylene group having from 2 to 3 carbons.

Examples of the divalent hydrocarbon group include an ethylene group, a propylene group, and a trimethylene group.

n4

In Formula ($X_2$-1), n4 represents from 1 to 10, and preferably from 1 to 5.

Case Where $X_1$ is Oxygen Atom or Sulfur Atom

In Formula (I), in the case where $X_1$ is an oxygen atom or a sulfur atom, n2 represents 0.

Organic Group

In an embodiment of the present invention, the group represented by Formula (I) can bond to the backbone of the compound according to an embodiment of the present invention through an organic group. Furthermore, the group represented by Formula (I) can bond to, for example, a side chain or a terminal of the backbone.

The organic group is not particularly limited. Examples of the organic group include divalent or trivalent linking groups having two or more carbons.

Specific examples of the organic group include linking groups represented by
HOOC—CH$_2$—C$^a$H—*,
C$^a$H$_2$—CH(COOH)—* and
C$^a$H$_2$—C$^a$H—*.

In each of the linking groups, * represents a bonding position at which the linking group bonds to the backbone of the compound according to an embodiment of the present invention, and C$^a$ represents a carbon atom to which the group represented by Formula (I) or the group represented by Formula (II) can bond.

Carboxy Group in Linking Groups Described Above

The carboxy group in HOOC—CH$_2$—CH—* and C$^a$H$_2$—CH(COOH)—* can contribute to dispersion of silica.

C$^a$H$_2$—C$^a$H—*

In the C$^a$H$_2$—C$^a$H—*, among two C$^a$ moieties, the group represented by Formula (I) or the group represented by Formula (II) can bond to one of the C$^a$ moieties.

Group Represented by Formula (I') or Formula (II')

The compound according to an embodiment of the present invention can further contain the group represented by Formula (I') or Formula (II') below.

In the case where the compound according to an embodiment of the present invention further has the group represented by Formula (I') below or Formula (II') below, an example of a preferable aspect is one in which the linking group is the C$^a$H$_2$—CH—*, the group represented by Formula (I) or the group represented by Formula (II) bonds to one of the two C$^a$ moieties described above, and the group represented by Formula (I') below or the group represented by Formula (II') below bonds to the other C$^a$ that is different from the aforementioned C$^a$.

Group Represented by Formula (I')

The Formula (I') is as follows. As shown below, the group represented by Formula (I') forms a salt.

[Chemical Formula 10]

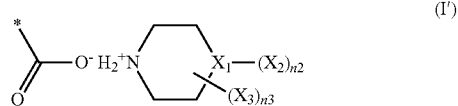

(I')

In Formula (I'), $X_1$ represents at least one selected from the group consisting of a nitrogen atom, an oxygen atom, and a sulfur atom, $X_3$ represents a hydrocarbon group, and n3 represents from 0 to 4.

In the case where $X_1$ is a nitrogen atom, n2 is 1, $X_2$ represents at least one selected from the group consisting of sulfone-based protecting groups, carbamate-based protecting groups, and Formula ($X_2$-1): —(R—O)$_{n4}$—H, and in Formula ($X_2$-1), R each independently represents a divalent hydrocarbon group, and n4 represents from 1 to 10.

In the case where $X_1$ is an oxygen atom or a sulfur atom, n2 represents 0.

In Formula (I'), $X_1$ to $X_3$, n2, n3, and * are respectively the same as $X_1$ to $X_3$, n2, n3, and * of the group represented by Formula (I) described above.

Group Represented by Formula (II')

The Formula (II') is as follows. As shown below, the group represented by Formula (II') forms a salt.

[Chemical Formula 11]

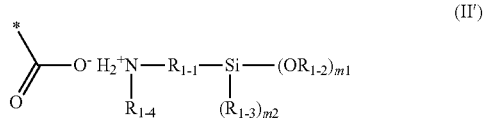

(II')

In Formula (II'), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, $R_{1-4}$ represents a hydrogen atom or a monovalent hydrocarbon group, and * represents a bonding position.

In Formula (II'), $R_{1-1}$ to $R_{1-4}$, m1, m2, m1+m2, and * are respectively the same as $R_{1-1}$ to $R_{1-4}$, m1, m2, m1+m2, and * of the group represented by Formula (I) described above.

Specific Example of Group Having Group Represented by Formula (I)

Examples of the group having the group represented by Formula (I) (including the group represented by Formula (I) and the organic group described above) include groups represented by Formula (I-1) to Formula (I-4), Formula (V-1), and Formula (V-2) below.

[Chemical Formula 12]

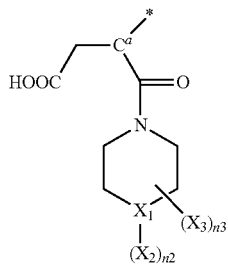
(I-1)

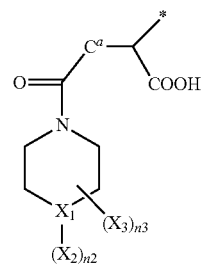
(I-2)

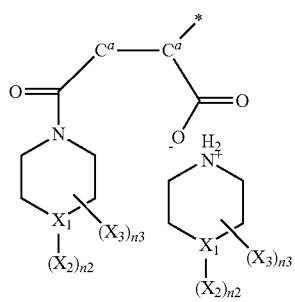
(I-3)

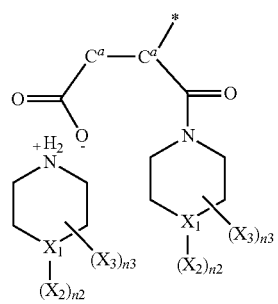
(I-4)

[Chemical Formula 13]

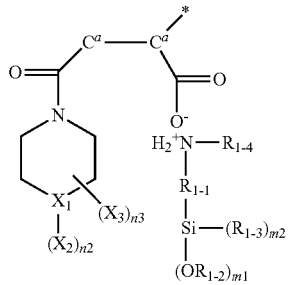
(V-1)

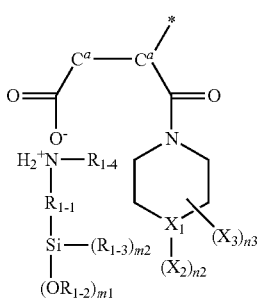
(V-2)

In each of the formulas above, * represents a bonding position at which the group represented by each of the formulas bonds to the backbone of the compound according to an embodiment of the present invention, and $C^\alpha$ represents a carbon atom to which the group represented by Formula (I), Formula (I'), or Formula (II') bonds.

In Formula (I-3) or Formula (I-4), a plurality of the $X_1$ moieties may be the same or different. The same applies to $X_2$, $X_3$, n2, and n3.

From the perspective of achieving superior processability and silica dispersibility, the group having the group represented by Formula (I) is preferably the group represented by Formula (V-1) or Formula (V-2).

Group Represented by Formula (II)

The group represented by Formula (II) contained in the compound according to an embodiment of the present invention is as follows.

[Chemical Formula 14]

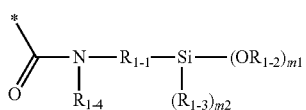
(II)

$R_{1-1}$

In Formula (II), $R_{1-1}$ represents a divalent hydrocarbon group. The divalent hydrocarbon group is not particularly limited. Examples thereof include aliphatic hydrocarbon groups (including straight-chain, branched chain, and cyclic), aromatic hydrocarbon groups, and combinations thereof. The divalent hydrocarbon group is preferably an alkylene group having from 2 to 6 carbons. Examples of the divalent hydrocarbon group include an ethylene group, a propylene group, a trimethylene group, a tetramethylene group, and an isobutylene group.

$R_{1-2}$ and $R_{1-3}$

In Formula (II), $R_{1-2}$ and $R_{1-3}$ each independently represent a monovalent hydrocarbon group. The monovalent hydrocarbon group is not particularly limited. Examples thereof include aliphatic hydrocarbon groups (including straight-chain, branched chain, and cyclic), aromatic hydrocarbon groups, and combinations thereof. The monovalent hydrocarbon group is preferably an alkyl group having from 1 to 3 carbons, and more preferably a methyl group or an ethyl group.

m1

In Formula (II), m1 is from 1 to 3, and preferably from 2 to 3.

m2

In Formula (II), m2 is from 0 to 2, and preferably from 0 to 1.

m1+m2

In Formula (II), m1+m2 is 3.

$R_{1-4}$

In Formula (II), $R_{1-4}$ represents a hydrogen atom or a monovalent hydrocarbon group. The monovalent hydrocarbon group is the same as the monovalent hydrocarbon group as $R_{1-2}$ or $R_{1-3}$ described above.

From the perspective of achieving superior processability, $R_{1-4}$ is preferably a hydrogen atom.

From the perspective of achieving superior silica dispersibility, $R_{1-4}$ is preferably a monovalent hydrocarbon group.

*

In Formula (II), * represents a bonding position, and * is the same as * of Formula (I) described above.

Organic Group

In an embodiment of the present invention, the group represented by Formula (II) can bond to the backbone of the compound according to an embodiment of the present invention through an organic group. Furthermore, the group represented by Formula (II) can bond to, for example, a side chain or a terminal of the backbone.

The organic group is the same as the organic group to which the group represented by Formula (I) above can bond.

Specific Example of Group Having Group Represented by Formula (II)

Examples of the group having the group represented by Formula (II) (including the group represented by Formula (II) and the organic group) include groups represented by Formula (II-1) to Formula (II-4), Formula (V-3), and Formula (V-4) below.

[Chemical Formula 15]

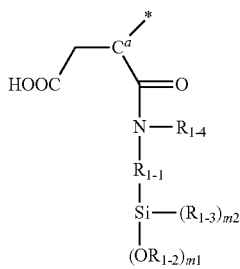

(II-1)

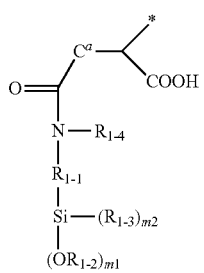

(II-2)

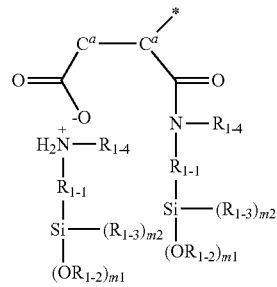

(II-3)

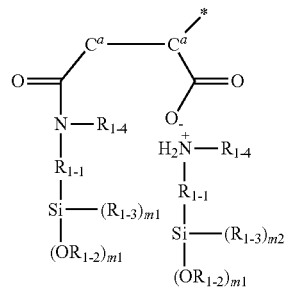

(II-4)

[Chemical Formula 16]

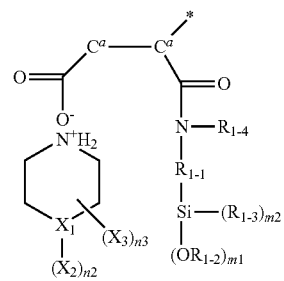

(V-3)

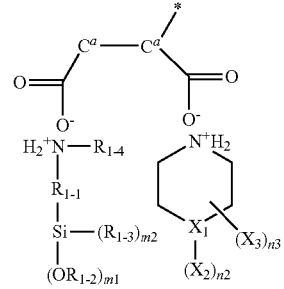

(V-4)

In each of the formulas above, * represents a bonding position at which the group represented by each of the formulas bonds to the backbone of the compound according to an embodiment of the present invention, and $C^a$ represents a carbon atom to which the group represented by Formula (II), Formula (I'), or Formula (II') bonds.

In Formula (II-3) or Formula (II-4), a plurality of the $R_{1-1}$ moieties may be the same or different. The same applies to $R_{1-2}$ to $R_{1-4}$, m1, and m2.

From the perspective of achieving superior processability and silica dispersibility, the group having the group represented by Formula (II) is preferably the group represented by Formula (V-3) or Formula (V-4).

From the perspective of achieving superior processability and silica dispersibility, the compound according to an embodiment of the present invention preferably has a group represented by at least one selected from the group consisting of Formula (I-1) to Formula (I-4), Formula (V-1), and Formula (V-2) and a group represented by at least one selected from the group consisting of Formula (II-1) to Formula (II-4), Formula (V-3), and Formula (V-4);

more preferably has a group represented by at least one selected from the group consisting of Formula (I-3) to Formula (I-4), Formula (V-1), and Formula (V-2) and a group represented by at least one selected from the group consisting of Formula (II-3) to Formula (II-4), Formula (V-3), and Formula (V-4); and even more preferably has a group represented by Formula (V-1) and/or a group represented by Formula (V-2), and a group represented by Formula (V-3) and/or a group represented by Formula (V-4).

Backbone of Compound According to Embodiment of Present Invention

The diene polymer constituting the backbone (basic structure or main chain) of the compound according to an embodiment of the present invention is not particularly limited as long as the diene polymer has a repeating unit obtained by a conjugated diene.

Examples of the diene polymer include diene rubbers, such as a natural rubber (NR), a butadiene rubber, an isoprene rubber (IR), an aromatic vinyl-conjugated diene copolymer rubber such as a styrene butadiene rubber (SBR), an acrylonitrile-butadiene copolymer rubber (NBR), a butyl rubber (IIR), a halogenated butyl rubber (Br-IIR and Cl-IIR), and a chloroprene rubber (CR).

The backbone is preferably a butadiene rubber or an SBR from the perspective of achieving superior processability and silica dispersibility.

From the perspective of achieving superior processability and silica dispersibility, the number average molecular weight of the compound according to an embodiment of the present invention is preferably from 1000 to 50000, and more preferably from 1000 to 30000.

In an embodiment of the present invention, the number average molecular weight of the compound according to an embodiment of the present invention is determined by a chart based on molecular weight obtained by gel permeation chromatography, measured based on calibration with polystyrene. The specific gel permeation chromatography measurement method is as follows.

Measurement instrument: HLC-8020 (available from Tosoh Corporation)

Column: GMH-HR-H (available from Tosoh Corporation), two connected in serial

Detector: Differential refractometer RI-8020 (available from Tosoh Corporation)

Eluent: Tetrahydrofuran

Column temperature: 40° C.

The compound according to an embodiment of the present invention may further contain a carboxy group in addition to the groups represented by Formula (I) and Formula (II) above. The carboxy group can be derived from, for example, a carboxy group-containing diene polymer that can be used during the production of the compound according to an embodiment of the present invention. The carboxy group may form an acid anhydride group.

The compound according to an embodiment of the present invention may further contain, for example, at least one selected from the group consisting of diene polymers containing a carboxy group or an acid anhydride group, heterocyclic compounds represented by Formula (III) below, and amino silane coupling agents represented by Formula (IV) below, which can be used for the production of the compound according to an embodiment of the present invention.

The compound according to an embodiment of the present invention can be used, for example, as a compounding agent for a rubber.

Method for Producing Modified Diene Polymer

The method for producing the modified diene polymer according to an embodiment of the present invention (production method according to an embodiment of the present invention) is a method for producing a modified diene polymer, where the modified diene polymer according to an embodiment of the present invention is produced by reacting a diene polymer (raw material diene polymer) having an acid anhydride group, a heterocyclic compound represented by Formula (III), and an amino silane coupling agent represented by Formula (IV).

In the production method according to an embodiment of the present invention, the acid anhydride group contained in the raw material diene polymer reacts with the HN< bond (group shown in a box in Formula (III) below) contained in the heterocyclic compound, and the acid anhydride group is modified into the group represented by Formula (I).

Furthermore, the acid anhydride group contained in the raw material diene polymer reacts with the amino group or the imino group (group shown in a box in Formula (IV) below) contained in the amino silane coupling agent, and the acid anhydride group is modified into the group represented by Formula (II).

As described above, the heterocyclic compound and the amino silane coupling agent can function as modifying agents for the acid anhydride group.

Heterocyclic Compound

The heterocyclic compound used in the production method according to an embodiment of the present invention is a compound represented by Formula (III) below.

[Chemical Formula 17]

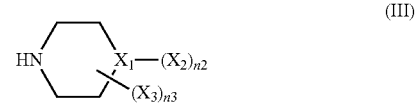

(III)

In Formula (III), $X_1$ represents at least one selected from the group consisting of a nitrogen atom, an oxygen atom, and a sulfur atom, $X_3$ represents a hydrocarbon group, and n3 represents from 0 to 4.

In the case where $X_1$ is a nitrogen atom, n2 is 1, $X_2$ represents at least one selected from the group consisting of sulfone-based protecting groups, carbamate-based protecting groups, and Formula ($X_2$-1): —(R—O)$_{n4}$—H, and in Formula ($X_2$-1), R each independently represents a divalent hydrocarbon group, and n4 represents from 1 to 10.

In the case where $X_1$ is an oxygen atom or a sulfur atom, n2 represents 0.

In Formula (III), $X_1$ to $X_3$, n2, and n3 are respectively the same as $X_1$ to $X_3$, n2, and n3 of the group represented by Formula (I) above.

The heterocyclic compound represented by Formula (III) has an imino group (group shown in a box in Formula (III) below) in the heterocycle.

[Chemical Formula 18]

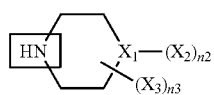
(III)

Amino Silane Coupling Agent

The amino silane coupling agent used in the production method according to an embodiment of the present invention is a compound represented by Formula (IV) below.

[Chemical Formula 19]

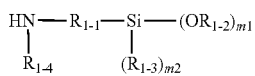
(IV)

In Formula (IV), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, and $R_{1-4}$ represents a hydrogen atom or a monovalent hydrocarbon group.

In Formula (IV), $R_{1-1}$ to $R_{1-4}$, m1, m2, and m1+m2 are respectively the same as $R_{1-1}$ to $R_{1-4}$, m1, m2, and m1+m2 of the group represented by Formula (I) described above.

The amino silane coupling agent represented by Formula (IV) above has an amino group (in the case where $R_{1-4}$ is a hydrogen atom) or an imino group (in the case where $R_{1-4}$ is a monovalent hydrocarbon group) (group shown in a box in Formula (IV) below).

[Chemical Formula 20]

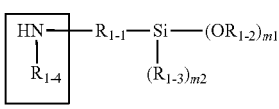
(IV)

Diene Polymer Having Acid Anhydride Group

The diene polymer (raw material diene polymer) used in the production method according to an embodiment of the present invention is a polymer having an acid anhydride group and the backbone thereof has a repeating unit obtained by a conjugated diene.

Backbone

The backbone of the raw material diene polymer is not particularly limited as long as the backbone is a polymer having a repeating unit obtained by a conjugated diene. Examples thereof include those same as the backbone of the compound according to an embodiment of the present invention described above.

Acid Anhydride Group

The acid anhydride group contained in the raw material diene polymer is not particularly limited as long as the acid anhydride group is a group having —CO—O—CO—.

Examples of the acid anhydride group include groups represented by the formula below (hereinafter, also referred to as a group obtained by maleic anhydride).

[Chemical Formula 21]

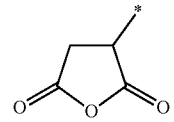

In the formula above, * represents a bonding position with the raw material diene polymer.

The acid anhydride group can bond to the backbone directly or through an organic group. The organic group is not particularly limited.

Furthermore, the bonding position of the acid anhydride group in the raw material diene polymer is not particularly limited.

The acid anhydride group contained in the raw material diene polymer can bond to, for example, a terminal and/or a side chain of the backbone.

From the perspective of achieving superior processability and silica dispersibility, the number average molecular weight of the raw material diene polymer is preferably from 1000 to 50000, and more preferably from 1000 to 30000.

In an embodiment of the present invention, the number average molecular weight of the raw material diene polymer can be measured by gel permeation chromatography (GPC), based on calibration with polystyrene standard using tetrahydrofuran as a solvent.

From the perspective of achieving superior processability and silica dispersibility and excellent handleability in the production method according to an embodiment of the present invention, the raw material diene polymer is preferably liquid in an environment at 23° C.

The content of the acid anhydride group contained in the raw material diene polymer can be, for example, from 3 to 30 mass % relative to the (entire) amount of the raw material diene polymer.

Active Hydrogen Derived from NH< of Formula (III)/Acid Anhydride Group

In the production method according to an embodiment of the present invention, the number of equivalent of the active hydrogen (hydrogen shown in a box in Formula (III) above) bonding to the nitrogen atom of the heterocycle contained in the heterocyclic compound relative to the acid anhydride group (active hydrogen derived from NH< in Formula (III)/acid anhydride group) is preferably from 0.1 to 2.0 molar equivalents, more preferably from 0.5 to 2.0 molar equivalents, and even more preferably from 0.8 to 1.5 molar equivalents, from the perspective of achieving superior processability and silica dispersibility.

Active Hydrogen Derived from NH($R_{1-4}$)— of Formula (IV)/Acid Anhydride Group In the production method according to an embodiment of the present invention, the number of equivalent of the active hydrogen (hydrogen shown in a box in Formula (IV) above) bonding to the amino group and/or the imino group contained in the amino silane coupling agent relative to the acid anhydride group (active hydrogen derived from NH($R_{1-4}$)— of Formula (IV)/acid anhydride group) is preferably from 0.1 to 4.0 molar equivalents, more preferably from 1.0 to 4.0 molar equivalents, and even more preferably from 1.5 to 3.0 molar equivalents, from the perspective of achieving superior processability.

Examples of the production method according to an embodiment of the present invention include a method in which the raw material diene polymer, the heterocyclic compound, and the amino silane coupling agent are reacted, for example, at 0 to 30° C.

In the reaction, an organic solvent such as toluene can be further used. The used amount of the organic solvent can be, for example, from 10 to 300 parts by mass per 100 parts by mass total of the raw material diene polymer, the heterocyclic compound, and the amino silane coupling agent. In the case where the organic solvent is used, after the reaction, the organic solvent is distilled off from the reaction solution to obtain the compound according to an embodiment of the present invention.

Degree of Modification 1

From the perspective of achieving superior processability and silica dispersibility, the degree of modification of the acid anhydride group that is modified into the group represented by Formula (1) above (hereinafter, this is also referred to as "degree of modification 1") is preferably from 10 to 90%, more preferably from 20 to 80%, even more preferably from 30 to 75%, and particularly preferably from 50 to 75%.

The degree of modification 1 represents the proportion (mol %) of acid anhydride groups that have been modified into the group represented by Formula (I) above among all the acid anhydride groups contained in the raw material diene polymer.

Furthermore, in the compound according to an embodiment of the present invention, the degree of modification 1 is a proportion (mol %) of the group represented by Formula (1) above relative to the total number of moles of the group represented by Formula (1) above, the group represented by Formula (2) above, and the acid anhydride group derived from the raw material.

The calculation method for the degree of modification 1 in an embodiment of the present invention is as follows.

First, each of the raw material diene polymer and the modified diene polymer is analyzed by $^1$H-NMR measurement (solvent: CDCl$_3$; 400 MHz; reference material: tetramethylsilane).

Then, based on the chart obtained by the analysis, the area of the peak around 3.66 ppm (assigned to the proton of the carbon adjacent to the amide bond) is measured to calculate the degree of modification 1.

Note that the $^1$H-NMR measurement of the modified diene polymer was performed by using a sample obtained by dissolving the modified diene polymer in toluene, performing purification by methanol precipitation twice, and then drying under reduced pressure. The same applies to the degree of modification 2 described below.

Furthermore, the degree of modification 1 does not include the modification by the group represented by Formula (I') above.

Degree of Modification 2

From the perspective of achieving superior processability and silica dispersibility, the degree of modification of the acid anhydride group that is modified into the group represented by Formula (2) above (hereinafter, this is also referred to as "degree of modification 2") is preferably from 10 to 90%, more preferably from 20 to 80%, even more preferably from 25 to 70%, and particularly preferably from 25 to 50%.

The degree of modification 2 represents the proportion (mol %) of acid anhydride groups that have been modified into the group represented by Formula (2) above among all the acid anhydride groups contained in the raw material diene polymer.

Furthermore, in the compound according to an embodiment of the present invention, the degree of modification 2 is a proportion (mol %) of the group represented by Formula (2) above relative to the total number of moles of the group represented by Formula (1) above, the group represented by Formula (2) above, and the acid anhydride group derived from the raw material.

The calculation method for the degree of modification 2 in an embodiment of the present invention is as follows.

First, each of the raw material diene polymer and the modified diene polymer is analyzed by $^1$H-NMR measurement (solvent: CDCl$_3$; 400 MHz; reference material: tetramethylsilane).

Then, based on the chart obtained by the analysis, the area of the peak around 3.44 ppm (assigned to the proton of the carbon adjacent to the amide bond) is measured to calculate the degree of modification 2.

Note that the degree of modification 2 does not include the modification by the group represented by Formula (II') above.

Total Degree of Modification

From the perspective of achieving superior processability and silica dispersibility, the sum (total degree of modification) of the degree of modification 1 and the degree of modification 2 is preferably from 20 to 100%, and more preferably from 75 to 98%.

Rubber Composition

The rubber composition according to an embodiment of the present invention (composition according to an embodiment of the present invention) is a rubber composition containing a modified diene polymer having a group represented by Formula (I) below and a group represented by Formula (II) below, and silica.

[Chemical Formula 22]

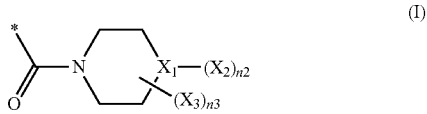

(I)

In Formula (I), $X_1$ represents at least one selected from the group consisting of a nitrogen atom, an oxygen atom, and a sulfur atom, $X_3$ represents a hydrocarbon group, n3 represents from 0 to 4, and * represents a bonding position.

In the case where $X_1$ is a nitrogen atom, n2 is 1, $X_2$ represents at least one selected from the group consisting of sulfone-based protecting groups, carbamate-based protecting groups, and Formula ($X_2$-1): —(R—O)$_{n4}$—H, and in Formula ($X_2$-1), R each independently represents a divalent hydrocarbon group, and n4 represents from 1 to 10.

In the case where $X_1$ is an oxygen atom or a sulfur atom, n2 represents 0.

[Chemical Formula 23]

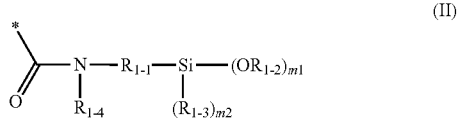

(II)

In Formula (II), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, $R_{1-4}$ represents a hydrogen atom or a monovalent hydrocarbon group, and * represents a bonding position.

Modified Diene Polymer

The modified diene polymer contained in the composition according to an embodiment of the present invention is not particularly limited as long as the modified diene polymer is the modified diene polymer according to an embodiment of the present invention (compound according to an embodiment of the present invention).

Content of Modified Diene Polymer

The content of the modified diene polymer is preferably from 1 to 30 mass %, more preferably from 1 to 20 mass %, and even more preferably from 8 to 15 mass %, relative to the content of the silica, from the perspective of achieving superior processability and silica dispersibility.

Silica

The silica included in the composition according to an embodiment of the present invention is not particularly limited.

Examples of the silica include fumed silica, calcined silica, precipitated silica, pulverized silica, molten silica, and colloidal silica.

The BET specific surface area of the silica is preferably from 150 to 300 $m^2/g$, from the perspective of achieving superior low heat buildup. The BET specific surface area of the silica is to be measured in accordance with a Brunauer-Emmett-Teller method corresponding to Annex D of ISO 5794/1.

Diene Rubber

The composition according to an embodiment of the present invention may further contain a diene rubber (other than the modified diene polymer described above) in addition to the modified diene polymer and the silica described above.

In the case where the composition according to an embodiment of the present invention further contains the diene rubber described above, because the backbone of the modified diene polymer according to an embodiment of the present invention is a diene polymer, the modified diene polymer according to an embodiment of the present invention has affinity for the diene rubber. Therefore, in the case described above, the present inventors presume that the modified diene polymer according to an embodiment of the present invention can function as a mediation of the diene rubber and the silica and improve the silica dispersibility in the diene rubber, and thus excellent processability is achieved even in the case where the composition according to an embodiment of the present invention further contains the diene rubber.

Examples of the diene rubber include diene rubbers, such as a natural rubber (NR), a butadiene rubber, an isoprene rubber (IR), an aromatic vinyl-conjugated diene copolymer rubber such as a styrene butadiene rubber (SBR), an acrylonitrile-butadiene copolymer rubber (NBR), a butyl rubber (IIR), a halogenated butyl rubber (Br-IIR and Cl-IIR), and a chloroprene rubber (CR).

The diene rubber is preferably a butadiene rubber or an SBR from the perspective of achieving superior processability and silica dispersibility.

From the perspective of achieving superior processability and silica dispersibility, the weight average molecular weight of the diene rubber is preferably from 100000 to 3000000, and more preferably from 100000 to 2000000.

In an embodiment of the present invention, the weight average molecular weight of the diene rubber is measured by gel permeation chromatography (GPC), based on calibration with polystyrene standard using tetrahydrofuran as a solvent.

In the case where the composition according to an embodiment of the present invention further contains the diene rubber, the content of the silica is preferably from 30 to 150 parts by mass, and more preferably from 50 to 130 parts by mass, per 100 parts by mass of the diene rubber, from the perspective of achieving superior low heat buildup.

Additives

The composition according to an embodiment of the present invention may further contain additives as necessary within a scope that does not impair the effect or purpose thereof. Examples of the additive include those generally used in rubber compositions, such as fillers other than silica (e.g., carbon black), silane coupling agents (e.g., silane coupling agent containing sulfur), vulcanization accelerators, resins, zinc oxide, stearic acid, anti-aging agents, processing aids, oils, vulcanizing agents such as sulfur, and peroxides. The content of the additive can be appropriately selected.

Carbon Black

The composition according to an embodiment of the present invention preferably further contains carbon black.

The carbon black is not particularly limited. For example, as the carbon black, various grades of carbon black can be used, such as Super Abrasion Furnace (SAF; hereinafter the same)-High Structure (HS; hereinafter the same), SAF, Intermediate Super Abrasion Furnace (ISAF; hereinafter the same)-HS, ISAF, ISAF-Low Structure (LS; hereinafter the same), Intermediate ISAF (IISAF)-HS, High Abrasion Furnace (HAF; hereinafter the same)-HS, HAF, HAF-LS, and Fast Extruding Furnace (FEF).

The nitrogen adsorption specific surface area ($N_2SA$) of the carbon black is preferably from 50 to 200 $m^2/g$ from the perspective of achieving superior processability and silica dispersibility. The nitrogen adsorption specific surface area of the carbon black is measured in accordance with JIS K 6217-2.

The content of the carbon black is preferably from 10 to 500 parts by mass, and more preferably from 10 to 200 parts by mass, per 100 parts by mass of the modified diene polymer.

In the case where the composition according to an embodiment of the present invention further contains the diene rubber, the content of the carbon black is preferably from 1 to 50 parts by mass, and more preferably from 1 to 20 parts by mass, per 100 parts by mass of the diene rubber.

Method for Producing Rubber Composition

The production method for the composition according to an embodiment of the present invention is not particularly limited. Examples thereof include a method in which the essential components described above and optional components that can be used as necessary (other than sulfur and vulcanization accelerators) are mixed at 100 to 200° C. using known methods and apparatuses (e.g., a Banbury mixer, a kneader, or a roll) to obtain a mixture, and then the sulfur and the vulcanization accelerators are added to the mixture and further mixed to produce the composition according to an embodiment of the present invention.

The composition according to an embodiment of the present invention can be vulcanized or crosslinked, for example, under the known vulcanization or crosslinking conditions.

For example, tires, conveyor belts, and hoses can be produced by using the composition according to an embodiment of the present invention.

Example

The present invention is described below in detail using examples but the present invention is not limited to such examples.

Synthesis of Modified Diene Polymer 1

In toluene, 49.5 g of maleic anhydride-modified polybutadiene (Ricon 130MA8, available from Total Lubricants Japan Co., Ltd.; acid content: from 7 to 9 mass %; number average molecular weight: 5246; containing the group obtained by maleic anhydride described above as an acid anhydride group; liquid in an environment at 23° C.; the same applies hereinafter), 1.7 g of morpholine (available from Tokyo Chemical Industry Co., Ltd.; number of equivalent of active hydrogen bonding to the nitrogen atom of the morpholine relative to the acid anhydride group: 0.5 molar equivalents), and 4.4 g of 3-aminopropyltriethoxysilane (KBE-903, available from Shin-Etsu Chemical Co., Ltd.; number of equivalent of active hydrogen of the amino group relative to the acid anhydride group: 1.0 molar equivalent) were reacted at room temperature for 30 minutes. The reaction solution was concentrated to obtain the modified diene polymer 1.

The number average molecular weight of the modified diene polymer 1 was 5357, the degree of modification 1 was 36%, and the degree of modification 2 was 35%.

Note that the modified diene polymers 1 to 6 each had the group represented by Formula (I) at a side chain or a terminal, bonded through an organic group. The organic group may have a carboxy group, or a salt formed from a carboxy group and the heterocyclic compound used during synthesis of the modified diene polymers 1 to 6. The same applies to the group represented by Formula (II).

Synthesis of Modified Diene Polymer 2

In toluene, 49.5 g of maleic anhydride-modified polybutadiene (Ricon 130MA8, available from Total Lubricants Japan Co., Ltd.), 3.4 g of morpholine (available from Tokyo Chemical Industry Co., Ltd.; number of equivalent of active hydrogen bonding to the nitrogen atom of the morpholine relative to the acid anhydride group: 1.0 molar equivalent), and 8.8 g of 3-aminopropyltriethoxysilane (KBE-903, available from Shin-Etsu Chemical Co., Ltd.; number of equivalent of active hydrogen of the amino group relative to the acid anhydride group: 2.0 molar equivalents) were reacted at room temperature for 30 minutes. The reaction solution was concentrated to obtain the modified diene polymer 2.

The number average molecular weight of the modified diene polymer 2 was 4737, the degree of modification 1 was 65%, and the degree of modification 2 was 33%.

Synthesis of Modified Diene Polymer 3

In toluene, 49.5 g of maleic anhydride-modified polybutadiene (Ricon 130MA8, available from Total Lubricants Japan Co., Ltd.), 5.2 g of 1-(2-hydroxyethyl)piperazine (hydroxyethylpiperazine, available from Nippon Nyukazai Co., Ltd.; number of equivalent of active hydrogen bonding to the nitrogen atom of the piperazine ring of the piperazine compound relative to the acid anhydride group: 1.0 molar equivalent), and 8.8 g of 3-aminopropyltriethoxysilane (KBE-903, available from Shin-Etsu Chemical Co., Ltd.; number of equivalent of active hydrogen of the amino group relative to the acid anhydride group: 2.0 molar equivalents) were reacted at room temperature for 30 minutes. The reaction solution was concentrated to obtain the modified diene polymer 3.

The number average molecular weight of the modified diene polymer 3 was 4851, the degree of modification 1 was 59%, and the degree of modification 2 was 35%.

Synthesis of Modified Diene Polymer 4

In toluene, 79.2 g of maleic anhydride-modified polybutadiene (Ricon 131MA5, available from Total Lubricants Japan Co., Ltd.; acid content: 4.5 to 5.5 mass %; 1,2-vinyl bond content relative to the amount of butadiene: 18 to 33 mol %; number average molecular weight: 8986; containing the group obtained by maleic anhydride as an acid anhydride group; liquid in an environment at 23° C.), 1.7 g of morpholine (available from Tokyo Chemical Industry Co., Ltd.; number of equivalent of active hydrogen bonding to the nitrogen atom of the morpholine relative to the acid anhydride group: 0.5 molar equivalents), and 4.4 g of 3-aminopropyltriethoxysilane (KBE-903, available from Shin-Etsu Chemical Co., Ltd.; number of equivalent of active hydrogen of the amino group relative to the acid anhydride group: 1.0 molar equivalent) were reacted at room temperature for 30 minutes. The reaction solution was concentrated to obtain the modified diene polymer 4.

The number average molecular weight of the modified diene polymer 4 was 9090, the degree of modification 1 was 37%, and the degree of modification 2 was 34%.

Synthesis of Modified Diene Polymer 5

In toluene, 66.0 g of maleic anhydride-modified styrene-butadiene copolymer (Ricon 184MA6, available from Total Lubricants Japan Co., Ltd.; acid content: 5 to 7 mass %; 1,2-vinyl bond content relative to the amount of butadiene: 20 to 40 mol %; styrene content: 17 to 27 mass %; number average molecular weight: 12650; containing the group obtained by maleic anhydride as an acid anhydride group; liquid in an environment at 23° C.), 1.7 g of morpholine (available from Tokyo Chemical Industry Co., Ltd.; number of equivalent of active hydrogen bonding to the nitrogen atom of the morpholine relative to the acid anhydride group: 0.5 molar equivalents), and 4.4 g of 3-aminopropyltriethoxysilane (KBE-903, available from Shin-Etsu Chemical Co., Ltd.; number of equivalent of active hydrogen of the amino group relative to the acid anhydride group: 1.0 molar equivalent) were reacted at room temperature for 30 minutes. The reaction solution was concentrated to obtain the modified diene polymer 5.

The number average molecular weight of the modified diene polymer 5 was 12785, the degree of modification 1 was 34%, and the degree of modification 2 was 31%.

Synthesis of Modified Diene Polymer 6

In toluene, 49.5 g of maleic anhydride-modified polybutadiene (Ricon 130MA8, available from Total Lubricants Japan Co., Ltd.), 1.7 g of morpholine (available from Tokyo Chemical Industry Co., Ltd.; number of equivalent of active hydrogen bonding to the nitrogen atom of the morpholine relative to the acid anhydride group: 0.5 molar equivalents), and 4.4 g of N-ethyl-3-aminoisobutyltrimethoxysilane (A-LINK15, available from Momentive Performance Materials Japan LLC; number of equivalent of active hydrogen of the imino group relative to the acid anhydride group: 0.5 molar equivalents) were reacted at room temperature for 30 minutes. The reaction solution was concentrated to obtain the modified diene polymer 6.

The number average molecular weight of the modified diene polymer 6 was 5360, the degree of modification 1 was 38%, and the degree of modification 2 was 38%.

Synthesis of (Comparative) Modified Diene Polymer 8

In toluene, 49.5 g of maleic anhydride-modified polybutadiene (Ricon 130MA8, available from Total Lubricants Japan Co., Ltd.) and 7.4 g of dodecylamine (available from Tokyo Chemical Industry Co., Ltd.; number of equivalent of active hydrogen of the amino group relative to the acid anhydride group: 2.0 molar equivalents) were reacted at room temperature for 30 minutes.

The reaction solution was concentrated to obtain the (comparative) modified diene polymer 8. The (comparative) modified diene polymer 8 did not have groups represented by Formula (I) and Formula (II) but had a group represented by $C_{12}H_{25}$—NH—CO— in place of the group represented by Formula (I).

Synthesis of (Comparative) Modified Diene Polymer 9

In toluene, 49.5 g of maleic anhydride-modified polybutadiene (Ricon 130MA8, available from Total Lubricants Japan Co., Ltd.) and 8.8 g of 3-aminopropyltriethoxysilane (KBE-903, available from Shin-Etsu Chemical Co., Ltd.; number of equivalent of active hydrogen of the amino group relative to the acid anhydride group: 2.0 molar equivalents) were reacted at room temperature for 30 minutes. The reaction solution was concentrated to obtain the (comparative) modified diene polymer 9. The (comparative) modified diene polymer 9 had the group represented by Formula (II) but did not have the group represented by Formula (I).

Synthesis of (Comparative) Modified Diene Polymer 11

In toluene, 49.5 g of maleic anhydride-modified polybutadiene (Ricon 130MA8, available from Total Lubricants Japan Co., Ltd.) and 3.4 g of morpholine (available from Tokyo Chemical Industry Co., Ltd.; number of equivalent of active hydrogen bonding to the nitrogen atom of the morpholine relative to the acid anhydride group: 1.0 molar equivalent) were reacted at room temperature for 30 minutes. The reaction solution was concentrated to obtain the (comparative) modified diene polymerization 11. The (comparative) modified diene polymer 11 had the group represented by Formula (I) but did not have the group represented by Formula (II).

Production of the Rubber Composition

The components shown in Table 1 below were used in compositions (part by mass) shown in the same table.

Specifically, a mixture was obtained by heating the components shown in Table 1 below, other than the sulfur and the vulcanization accelerators, in a 1.7 L closed-type Banbury mixer to a temperature approximately 150° C., mixing the mixture for 5 minutes, then discharging the mixture, and cooling it to room temperature. The sulfur and the vulcanization accelerators were then mixed into the mixture obtained as described above using the Banbury mixer described above to produce a rubber composition.

Note that, in Table 1, the blended amount of the SBR was the amount of the rubber (oil extended product) (unit: part by mass). The net content of the SBR in 110 parts by mass of the oil extended SBR was 80 parts by mass.

Evaluation

The following evaluations were performed by using the rubber compositions produced as described above. The results are shown in Table 1. In Table 1, for each evaluation item, the evaluation result of each of the examples was shown as an index value relative to the evaluation result (100) of Standard Example 1.

Mooney Viscosity

For each of the rubber compositions (unvulcanized) produced as described above, according to JIS K 6300-1: 2013, the Mooney viscosity ($ML_{1+4}$) was measured by using an L-shaped rotor under the conditions that the preheating time was 1 minute, the rotation time of the rotor was 4 minutes, and the test temperature was 100° C.

In an embodiment of the present invention, the case where the index value of the Mooney viscosity was 94 or less was evaluated as achieving excellent processability. A smaller index value indicated superior processability.

Payne Effect

The rubber composition produced as described above was vulcanized at 160° C. for 20 minutes. The strain shear stress G' (0.28%) at a strain of 0.28% and the strain shear stress G' (450%) at a strain of 450% were measured for the obtained vulcanized rubber in accordance with ASTM D6204 at 110° C. using the RPA 2000 (strain shear stress measurement instrument, available from Alpha Technologies) and ΔG'=G' (0.28%)–G' (450%) was calculated.

In an embodiment of the present invention, a smaller index value of ΔG' indicates superior reduction or suppression of the Payne effect (achieving superior silane dispersibility).

TABLE 1

| | Standard Example 1 | Example 1 | 2 | 3 | 4 | 5 | 6 | 7 | 8 | Comparative Example 1 | 2 | 3 | 4 | 5 | 6 |
|---|---|---|---|---|---|---|---|---|---|---|---|---|---|---|---|
| SBR *1 | 110.0 | 110.0 | 110.0 | 110.0 | 110.0 | 110.0 | 110.0 | 110.0 | 110.0 | 110.0 | 110.0 | 110.0 | 110.0 | 110.0 | 110.0 |
| BR *2 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Silica 1 *3 | 90.0 | 90.0 | 90.0 | 90.0 | 90.0 | 90.0 | 90.0 | 90.0 | 90.0 | 90.0 | 90.0 | 90.0 | 90.0 | 90.0 | 90.0 |
| Carbon black *4 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Silane coupling agent *5 | 7.2 | 7.2 | 7.2 | 7.2 | 7.2 | 7.2 | 7.2 | 7.2 | 7.2 | 7.2 | 7.2 | 7.2 | 7.2 | 7.2 | 7.2 |
| Zinc oxide *6 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Stearic acid *7 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Anti-aging agent *8 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Process oil *9 | 20.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Modified diene polymer 1 *10 | | 10.0 | | | | | | | | | | | | | |
| Modified diene polymer 2 *11 | | | 10.0 | | | | | 5 | 20 | | | | | | |
| Modified diene polymer 3 *12 | | | | 10.0 | | | | | | | | | | | |
| Modified diene polymer 4 *13 | | | | | 10.0 | | | | | | | | | | |
| Modified diene polymer 5 *14 | | | | | | 10.0 | | | | | | | | | |
| Modified diene polymer 6 *15 | | | | | | | 10.0 | | | | | | | | |
| (Comparative) Modified diene polymer 7 *16 | | | | | | | | | | 10.0 | | | | | |
| (Comparative) Modified diene polymer 8 *17 | | | | | | | | | | | 10.0 | | | | |
| (Comparative) Modified diene polymer 9 *18 | | | | | | | | | | | | 10.0 | | | 5.0 |
| (Comparative) Modified diene polymer 10 *19 | | | | | | | | | | | | | 10.0 | | |
| (Comparative) Modified diene polymer 11 *23 | | | | | | | | | | | | | | 10.0 | 5.0 |
| Sulfur *20 | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 |
| Vulcanization accelerator 1 *21 | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 |
| Vulcanization accelerator 2 *22 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |

TABLE 1-continued

| | Standard Example 1 | Example | | | | | | | | Comparative Example | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Content of modified diene polymer relative to content of silica (mass %) | 0 | 11 | 11 | 11 | 11 | 11 | 11 | 6 | 22 | 11 | 11 | 11 | 11 | 11 | 11 |
| Mooney viscosity | 100 | 88 | 86 | 90 | 90 | 92 | 89 | 92 | 84 | 105 | 95 | 101 | 95 | 95 | 95 |
| Payne effect | 100 | 86 | 82 | 80 | 78 | 87 | 83 | 86 | 82 | 93 | 98 | 89 | 96 | 94 | 95 |

Details of the components described in Table 1 are as follows.

*1: SBR (Tufdene 3830, available from Asahi Kasei Corporation; oil extender content=37.5 parts by mass per 100 parts by mass of SBR), styrene butadiene rubber; weight average molecular weight: 950000

*2: BR (Nipol BR1220, available from Zeon Corporation), butadiene rubber; weight average molecular weight: 490000

*3: Silica 1 (Zeosil 1165MP, available from Rhodia Ltd.; BET specific surface area=165 m²/g)

*4: Carbon black (Show Black N339, available from Cabot Japan K. K.; nitrogen adsorption specific surface area ($N_2$SA)=90 m²/g)

*5: Silane coupling agent (Si69, available from Evonik Degussa; bis (3-triethoxysilylpropyl)tetrasulfide)

*6: Zinc oxide (Zinc Oxide III, available from Seido Chemical Industry Co., Ltd.)

*7: Stearic acid (Stearic acid YR, available from NOF Corporation)

*8: Anti-aging agent (Santoflex 6PPD, available from Solutia Europe)

*9: Process oil (Extract No. 4S, available from Showa Shell Sekiyu K. K.)

*10: Modified diene polymer 1 (modified diene polymer 1 synthesized as described above)

*11: Modified diene polymer 2 (modified diene polymer 2 synthesized as described above)

*12: Modified diene polymer 3 (modified diene polymer 3 synthesized as described above)

*13: Modified diene polymer 4 (modified diene polymer 4 synthesized as described above)

*14: Modified diene polymer 5 (modified diene polymer 5 synthesized as described above)

*15: Modified diene polymer 6 (modified diene polymer 6 synthesized as described above)

*16: (Comparative) Modified diene polymer 7 (Kuraprene LIR-403, available from Kuraray Co., Ltd.; maleic anhydride-modified polyisoprene)

*17: (Comparative) Modified diene polymer 8 ((comparative) modified diene polymer 8 synthesized as described above)

*18: (Comparative) Modified diene polymer 9 ((comparative) modified diene polymer 9 synthesized as described above)

*19: (Comparative) Diene polymer 10 (Kuraprene LBR-305, available from Kuraray Co., Ltd.; polybutadiene that was not modified)

*23: (Comparative) Modified diene polymer 11 ((comparative) modified diene polymer 11 synthesized as described above)

*20: Sulfur (sulfur treated with oil, available from Karuizawa Refinery Co., Ltd.)

*21: Vulcanization accelerator 1 (NOCCELER CZ-G, available from Ouchi Shinko Chemical Industrial Co., Ltd.)

*22: Vulcanization accelerator 2 (Perkacit DPG, available from Flexsys Inc.)

As is clear from the results shown in Table 1, Comparative Example 1, which contained no predetermined modified diene polymer but, instead, contained polyisoprene modified with maleic anhydride ((comparative) diene polymer 7), exhibited high Mooney viscosity and poor processability, and high Payne Effect and Poor Silica Dispersibility.

Comparative Example 2, which contained the polybutadiene having no predetermined groups represented by Formula (I) and Formula (II) but, instead, having the group represented by $C_{12}H_{25}$—NH—CO— ((comparative) diene polymer 8), exhibited high Mooney viscosity and poor processability, and high Payne effect and poor silica dispersibility.

Comparative Example 3, which contained the polybutadiene having the group represented by Formula (II) but having no group represented by Formula (I) ((comparative) diene polymer 9), exhibited high Mooney viscosity and poor processability, and high Payne effect and poor silica dispersibility.

Comparative Example 4, which contained the unmodified polybutadiene having no predetermined groups represented by Formula (I) and Formula (II) and no carboxy group ((comparative) diene polymer 10), exhibited high Mooney viscosity and poor processability, and high Payne effect and poor silica dispersibility.

Comparative Example 5, which contained the polybutadiene having the group represented by Formula (I) but having no group represented by Formula (II) ((comparative) modified diene polymer 11), exhibited high Mooney viscosity and poor processability, and high Payne effect and poor silica dispersibility.

Comparative Example 6, which contained the (comparative) diene polymer 9 and the (comparative) modified diene polymer 11, exhibited high Mooney viscosity and poor processability, and high Payne effect and poor silica dispersibility.

On the other hand, the rubber composition according to an embodiment of the present invention exhibited superior process ability and silica dispersibility.

Example 2 exhibited even better processability and silica dispersibility than those of Example 1. It is presumed that this is because the modified diene polymer 2 used in Example 2 had a greater sum of the degree of modification 1 and the degree of modification 2, a greater degree of modification 1 (contained a greater amount of the group represented by Formula (1) above), or a greater amount of the group represented by at least one selected from the group consisting of Formula (I-3), Formula (I-4), Formula (II-3), Formula (II-4), and Formula (V-1) to Formula (V-4), compared to that of the modified diene polymer 1 used in Example 1.

The invention claimed is:

1. A rubber composition comprising:
a modified diene polymer having a group represented by Formula (I) and a group represented by Formula (II); and
silica:

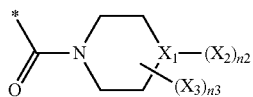
(I)

where, in Formula (I), $X_1$ represents at least one selected from the group consisting of a nitrogen atom, an oxygen atom, and a sulfur atom, $X_3$ represents a hydrocarbon group, n3 represents from 0 to 4, and * represents a bonding position, in the case where $X_1$ is a nitrogen atom, n2 is 1, $X_2$ represents at least one selected from the group consisting of sulfone-based protecting groups, carbamate-based protecting groups, and Formula ($X_2$-1): —(R—O)$_{n4}$—H, in Formula ($X_2$-1), R each independently represents a divalent hydrocarbon group, and n4 represents from 1 to 10, in the case where $X_1$ is an oxygen atom or a sulfur atom, n2 represents 0, and

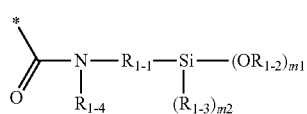
(II)

in Formula (II), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, $R_{1-4}$ represents a hydrogen atom or a monovalent hydrocarbon group, and * represents a bonding position.

2. The rubber composition according to claim 1, wherein, in Formula (I), $X_1$ represents a nitrogen atom, n2 is 1, and $X_2$ represents Formula ($X_2$-1).

3. The rubber composition according to claim 1, wherein, in Formula (I), $X_1$ represents an oxygen atom or a sulfur atom, and n2 is 0.

4. The rubber composition according to claim 1, wherein the group represented by Formula (I) is bonded to a side chain or a terminal of the modified diene polymer through an organic group.

5. The rubber composition according to claim 1, wherein the group represented by Formula (II) is bonded to a side chain or a terminal of the modified diene polymer through an organic group.

6. The rubber composition according to claim 1, further comprising a diene rubber (but other than the modified diene polymer).

7. A modified diene polymer comprising:
a group represented by Formula (I); and
a group represented by Formula (II):

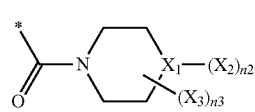
(I)

where, in Formula (I), $X_1$ represents at least one selected from the group consisting of a nitrogen atom, an oxygen atom, and a sulfur atom, $X_3$ represents a hydrocarbon group, n3 represents from 0 to 4, and * represents a bonding position, in the case where $X_1$ is a nitrogen atom, n2 is 1, $X_2$ represents at least one selected from the group consisting of sulfone-based protecting groups, carbamate-based protecting groups, and Formula ($X_2$-1): —(R—O)$_{n4}$—H, in Formula ($X_2$-1), R each independently represents a divalent hydrocarbon group, and n4 represents from 1 to 10, in the case where $X_1$ is an oxygen atom or a sulfur atom, n2 represents 0, and

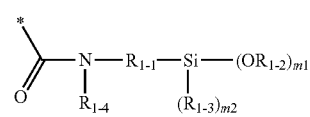
(II)

in Formula (II), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, $R_{1-4}$ represents a hydrogen atom or a monovalent hydrocarbon group, and * represents a bonding position.

8. A method for producing a modified diene polymer, wherein
the modified diene polymer described in claim 7 is produced by reacting
a diene polymer having an acid anhydride group,
a heterocyclic compound represented by Formula (III), and
an amino silane coupling agent represented by Formula (IV):

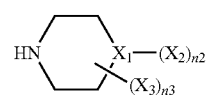
(III)

where, in Formula (III), $X_1$ represents at least one selected from the group consisting of a nitrogen atom, an oxygen atom, and a sulfur atom, $X_3$ represents a hydrocarbon group, and n3 represents from 0 to 4, in the case where $X_1$ is a nitrogen atom, n2 is 1, $X_2$ represents at least one selected from the group consisting of sulfone-based protecting groups, carbamate-based protecting groups, and Formula ($X_2$-1): —(R—O)$_{n4}$—H, in Formula ($X_2$-1), R each independently represents a divalent hydrocarbon group, and n4 represents from 1 to 10, in the case where $X_1$ is an oxygen atom or a sulfur atom, n2 represents 0, and

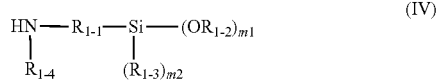

(IV)

in Formula (IV), $R_{1-1}$ represents a divalent hydrocarbon group, $R_{1-2}$ and $R_{1-3}$ each independently represent a monovalent hydrocarbon group, m1 is from 1 to 3, m2 is from 0 to 2, m1+m2 is 3, and $R_{1-4}$ represents a hydrogen atom or a monovalent hydrocarbon group.

9. The method for producing a modified diene polymer according to claim 8, wherein a number of equivalent of active hydrogen bonding to a nitrogen atom in a heterocycle contained in the heterocyclic compound relative to the acid anhydride group (active hydrogen derived from NH< in Formula (III)/acid anhydride group) is from 0.1 to 2.0 molar equivalents.

10. The method for producing a modified diene polymer according to claim 8, wherein a number of equivalent of active hydrogen of an amino group and/or an imino group contained in the amino silane coupling agent relative to the acid anhydride group (active hydrogen derived from NH($R_{1-4}$)— in Formula (IV)/acid anhydride group) is from 0.1 to 4.0 molar equivalents.

11. The method for producing a modified diene polymer according to claim 8, wherein the diene polymer containing the acid anhydride group is liquid in an environment at 23° C.

* * * * *